Nov. 21, 1967 J. M. PERHACH 3,353,632
SHAFT VIBRATION DAMPER
Filed Jan. 27, 1966 2 Sheets-Sheet 1
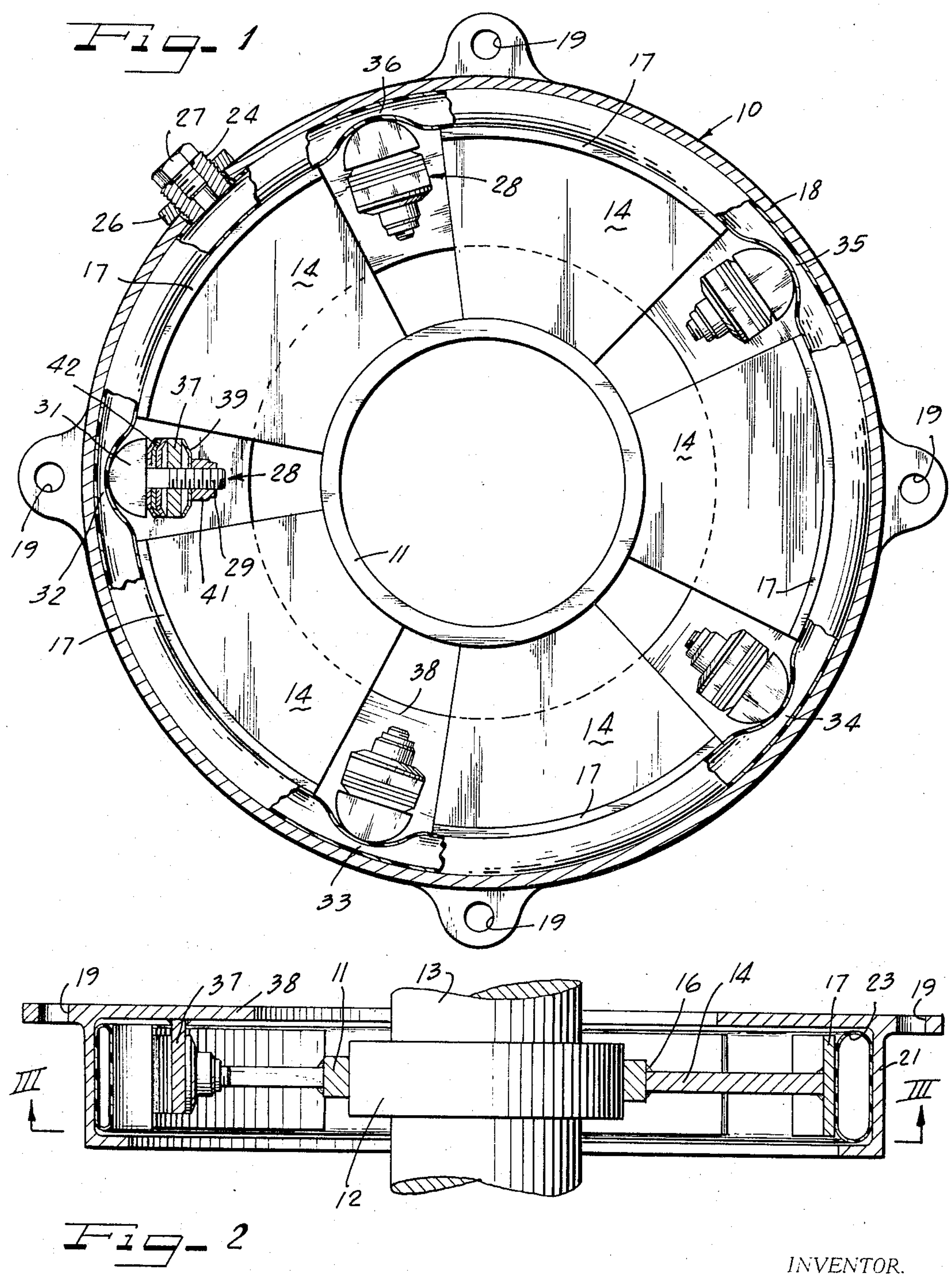
INVENTOR.
JOHN M. PERHACH
BY Hill, Sherman, Meroni, Gross & Simpson ATTORNEYS

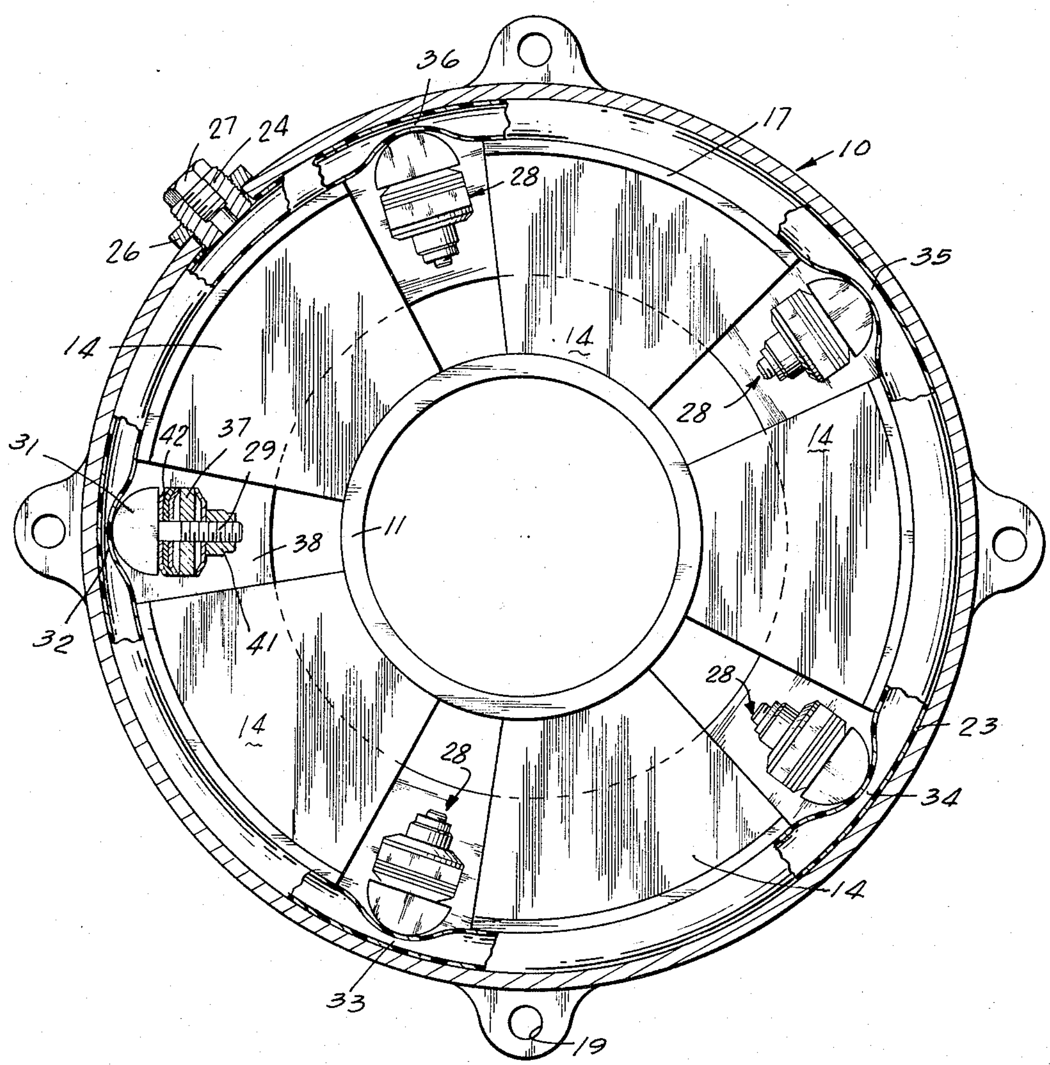
INVENTOR.
JOHN M. PERHACH
BY Hill, Sherman, Meroni, Gross & Simpson ATTORNEYS 3,353,632
Patented Nov. 21, 1967

3,353,632

SHAFT VIBRATION DAMPER

John M. Perhach, Buffalo, N.Y., assignor to Houdaille Industries, Inc., Buffalo, N.Y., a corporation of Michigan Filed Jan. 27, 1966, Ser. No. 523,430
7 Claims. (Cl. 188—1)

ABSTRACT OF THE DISCLOSURE

Shaft vibration damper including a collar arranged to be disposed about the shaft in coaxial relation to a support, with a closed tube carrying a viscous damping fluid being confined between the support and radial extensions on the collar. Variable constriction means and, preferably temperature compensating means are provided along the tube to provide constrictions in the tube, whereby eccentric motion of the shaft is damped by redistribution of the fluid in the tube.

The present invention relates to shaft damper assemblies, particularly designed to dampen lateral motion of a shaft operating at or above its critical speed.

Shaft damping devices of the past frequently relied upon the existence of shear forces in a viscous damping fluid. The present invention represents an improved on this type of assembly, and provides a shaft damping device which does not require replenishment of the viscous fluid, and which does not rely upon frictional forces to provide the damping. The absence of frictional forces provides almost pure laminar damping characteristics in the improved damper assembly of the present invention. In addition, with the arrangement of the present invention the strength of damping can be varied, or the damping coefficient can be changed quite easily.

One of the objects of the present invention is to provide an improved shaft damping assembly which does not rely upon the creation of frictional forces to achieve the damping function.

Another object of the invention is to provide a temperature responsive damping system which compensates for differences in viscosity in the damping fluid at different temperatures.

Still another object of the invention is to provide a shaft damping system in which the damping fluid is present in a totally confined environment, not requiring a reservoir for replenishing fluid lost during operation.

Still another object of the invention is to provide a shaft damping device in which the movement of the fluid is characterized by laminar flow to produce radial forces opposing the shaft motion.

In accordance with the present invention, I provide a collar which is arranged to be received in snug fitting relation to a shaft assembly, and to be physically displaced upon eccentric movement of the shaft which it surrounds. The collar is disposed in coaxial relation to a surrounding support, and is movable relative thereto. Extensions on the collar coooperate with a cylindrical wall of the support to confine the damping fluid therebetween. The damping fluid is disposed in a flexible tube, completely sealed from the ambient atmosphere. The support also carries a plurality of spaced constriction means which engage the flexible tube carrying the viscous damping fluid at spaced point therealong, providing fixed dimension orifices of reduced cross-sectional area along spaced areas of the fluid carrying tube. When the shaft commences excessive lateral movement, fluid is displaced in the closed system in the regions between the orifices, some of the fluid being compressed while other areas are permitted to expand. The resulting laminar flow of the liquid tends to restore the system to an equilibrium condition, and provides radial forces opposing the shaft motion.

The pressure which the constriction means exert on the tube can be varied mechanically by a simple adjustment of the constriction means. A temperature compensating feature can be provided in the constriction means which varies the pressure of the means on the tube as the temperature of the fluid varies, changing its viscosity.

A further description of the present invention will be made in conjunction with the attached sheets of drawings which illustrate a preferred embodiment of the invention.

In the drawings:

FIGURE 1 is a view partly in elevation and partly in cross-section illustrating one form of the invention;

FIGURE 2 is a cross-sectional view of the elements illustrating the position of the elements during eccentric rotation of the shaft; and FIGURE 3 is a cross-sectional view of the elements as shown in FIGURE 2, taken substantially along the line III—III of FIGURE 2.

FIGURE 1, reference numeral 10 indicates generally a shaft vibration damper for controlling lateral motion of a shaft, and embodying the features of the present invention. The damper assembly 10 includes a collar 11 arranged to follow the lateral movement of the shaft. As shown in FIGURE 2, the collar 11 may be snugly fit about a shaft bearing 12 which journals a shaft 13 for rotation therein.

Extending radially outwardly from the collar 11 is a plurality of plates 14, the plates 14 being secured to the collar 11 as by means of weld deposits 16 or the like. At the outer periphery of the plates 14 there is provided a plurality of arcuate rim segments 17, the outer peripheries of the plates 14 being secured centrally of the rim segments 17 as best seen in FIGURE 2.

The collar and plates assembly is supported for relative movement within a support 18 arranged to be secured on a stationary portion of the machine by bolts or the like passing through mounting holes 19 spaced about the support 18. The support 18 includes a cylindrical wall portion 21 which is disposed in spaced parallel relationship to the rim segments 17 as best seen in FIGURE 2. In the space thus provided, there is disposed a flexible tube 23 consisting of a tough, flexible material such as "Teflon" or other synthetic or natural material. A boss 24 is rigidly secured to the cylindrical wall 21, and clamps the periphery of an aperture provided in the tube 23 for the purpose of filling the tube with the viscous damping fluid. A lock ring 26 is secured about the boss 24 and holds it rigidly against the support 18. A plug 27 is threaded into the bore of the boss 24, and upon removal provides an inlet for the introduction of damping fluid into the tube 23. While any type of fluid can be used, depending upon the particular installation, a typical example of such a fluid is the silicone fluid marketed by Dow Corning Company, and having a viscosity of about 10,000 centistokes at room temperature. Typically, the tube 23 is filled with the fluid to a pressure of about 40 pounds per square inch gauge.

The control orifices for fluid movement are provided by means of controllers 28 spaced about the inner periphery of the tube 23. In FIGURE 1, the controller 28 is shown in cross-section to better illustrate the interior construction. As seen in that figure, the controller 28 includes a threaded stem 29 having a rounded head portion 31 extending therefrom and pushing against the tube 23 to provide an orifice 32 of reduced cross-sectional area in that vicinity. The other controllers 28 similarly provide orifices 33, 34, 35 and 36 about the periphery of the tube 23.

The stud 29 is received through one of a plurality of axially extending flanges 37 extending inwardly from the mounting plate 38 of the support 13. A disk spring 39 is confined between the flange 37 and a nut 41 threaded onto the stem 29. Movement of the nut 41 along the stem 29 changes the relative position of the headed end portion 31, thereby increasing or decreasing the size of the orifice 32.

Temperature compensation may be effected by providing a plurality of bi-metallic disks 42 between the flange 37 and the headed end portion 31. The disks 42 keep the damping characteristics of the assembly nearly constant during changes in ambient temperature. As the temperature increases, the disks 42 expand and thereby tend to decrease the size of the orifice 32, to compensate for lower fluid viscosity. As the temperature decreases, the disks 42 contract, thereby providing a larger orifice 32 to allow for a higher fluid viscosity.

The operation of the device should be evident from the foregoing discussion. As illustrated in FIGURES 2 and 3, as the collar 11 is displaced due to eccentric movement of the shaft, the rim segments 17 will act against the tube 23 to thereby provide chambers of expanded or compressed volume existing between the constant area orifices 32 to 36 inclusive. The fluid then tends to flow with laminar flow characteristics from the chambers of compressed volume to the chambers of expanding volume, resulting in the production of radial forces on the collar 11 which tend to damp out the vibration caused by the eccentric movement of the shaft 13. A replenishing reservoir is not required since the unit is filled at a given pressure at room temperature. As fluid contraction occurs, the walls of the tube 23 contract and internal pressure decreases. As the fluid expands, the internal pressure increases and the walls of the tube expand.

The absence of frictional forces in the damper of the present invention provides almost pure laminar damping characteristics. The strength of the damping and/or a change in the damping coefficient can be achieved by either changing the fluid in the tube 23 or by adjusting the setting of the orifice controller by means of the nut 41. Another feature of the improved shaft damper of the present invention is its inability to carry bending moments of the shaft. This provides superior damping characteristics since a rigid damper appears to the shaft like a fixed end, and the system resembles a shorter shaft having no damping.

From the foregoing, it will be understood that the improved shaft damping assembly of the present invention provides efficient vibration damping without relying upon the presence of frictional forces, and achieving essentially laminar damping characteristics. The assembly is temperature compensating, and can be readily reset to vary the damping characteristics.

It should also be evident that various modifications can be made to the described embodiments without departing from the scope of the present invention.

I claim as my invention:

1. A shaft vibration damper comprising a collar arranged for displacement upon eccentric movement of a shaft received therein, a support mounting said collar and permitting relative motion therebetween, a resiliently deformable tube having a damping fluid confined therein and means providing a continuous annular fluid reservoir between said support and said collar, means connected to said collar to bear against said fluid reservoir, and constriction means operating radially on said reservoir to provide a constant area orifice for the flow of fluid in said reservoir.

2. A shaft damper according to claim 1 in which said constriction means is manually adjustable to change the size of said orifice.

3. A shaft damper assembly according to claim 1 in which said constriction means includes temperature compensating means which automatically changes the size of said orifice in response to temperature changes.

4. A shaft damper according to claim 1 in which said constriction means includes a plurality of circumferentially spaced controllers.

5. A shaft vibration damper comprising a collar arranged to be received in snug fitting engagement about a shaft assembly and to be displaced upon eccentric movement of the shaft confined therein, a plurality of spaced plates extending radially outwardly from said collar, each of said plates having an axially extending annular flange portion extending therefrom, a support coaxial with said collar and having a cylindrical wall surrounding said annular flange portions, a resilient tube filled with a viscous damping fluid tightly received between said annular flange portions and said wall, a plurality of controller means fixedly secured to said support between said plates, said controller means each including a rounded end radially compressing said tube to thereby provide reduced area orifices along said tube.

6. The damper of claim 5 which includes means on said controller to adjust the pressure of said end portion against said tube.

7. The damper of claim 5 in which each of said controllers includes temperature responsive means which reduces the size of the orifice as the temperature of the fluid increases.

References Cited

UNITED STATES PATENTS

| | | | |
|---|---|---|---|
| 1,359,848 | 11/1920 | Techel. | |
| 1,657,390 | 1/1928 | Halikman | 188—1 |
| 2,614,896 | 10/1952 | Pierce | 188—1 X |
| 2,729,518 | 1/1956 | O'Connor | 248—358 X |
| 3,141,523 | 7/1964 | Dickie | 188—1 |

DUANE A. REGER, *Primary Examiner.*